United States Patent
Atzler et al.

(10) Patent No.: US 9,835,137 B2
(45) Date of Patent: Dec. 5, 2017

(54) COMPENSATION FOR ASYMMETRIC LOAD MOMENT EXPERIENCED BY WIND TURBINE ROTOR

(71) Applicant: VESTAS WIND SYSTEMS A/S, Aarhus N (DK)

(72) Inventors: Martin Atzler, Aarhus N (DK); Per Brath, Randers Nv (DK); Thomas Krüger, Tilst (DK); Ali Zaib, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 363 days.

(21) Appl. No.: 14/406,409

(22) PCT Filed: Jun. 7, 2013

(86) PCT No.: PCT/DK2013/050180
§ 371 (c)(1),
(2) Date: Dec. 8, 2014

(87) PCT Pub. No.: WO2013/182204
PCT Pub. Date: Dec. 12, 2013

(65) Prior Publication Data
US 2015/0132129 A1    May 14, 2015

Related U.S. Application Data

(60) Provisional application No. 61/657,334, filed on Jun. 8, 2012.

(30) Foreign Application Priority Data

Aug. 31, 2012   (DK) .................................. 2012 70527

(51) Int. Cl.
*F03D 7/04*   (2006.01)
*F03D 7/02*   (2006.01)

(52) U.S. Cl.
CPC ............. *F03D 7/044* (2013.01); *F03D 7/024* (2013.01); *F03D 7/0224* (2013.01);
(Continued)

(58) Field of Classification Search
CPC ...... F03D 7/024; F03D 7/0224; F03D 7/0284; F03D 7/0296; F03D 7/043; F03D 7/044; F03D 7/045; F03D 7/048; Y02E 10/723
See application file for complete search history.

(56) References Cited

U.S. PATENT DOCUMENTS

| | | |
|---|---|---|
| 2008/0247873 A1 | 10/2008 | Egedal |
| 2010/0014971 A1 | 1/2010 | Risager et al. |
| 2011/0229300 A1 | 9/2011 | Kanev et al. |

FOREIGN PATENT DOCUMENTS

| | | | | |
|---|---|---|---|---|
| CN | EP 2447527 A1 * | 5/2012 | ........... | F03D 7/0224 |
| EP | 1666723 A1 | 6/2006 | | |

(Continued)

OTHER PUBLICATIONS

T.G. Van Engelen et al: "Individual Pitch Control Inventory", Report ECN-C-03-138, Jan. 1, 2003, The Netherlands, pp. 7-16.
(Continued)

*Primary Examiner* — Ninh H Nguyen
*Assistant Examiner* — Brian P Wolcott
(74) *Attorney, Agent, or Firm* — Patterson + Sheridan, LLP

(57) ABSTRACT

A method of operating a wind turbine is provided. The wind turbine comprises a turbine rotor with at least two blades, each blade having a variable pitch angle. The method comprises determining mechanical loads on the blades, determining an asymmetric load moment experienced by the turbine rotor based on the mechanical loads on the blades, determining high order harmonics from the asymmetric load moment, and determining an individual pitch control signal (Continued)

for each of the blades for varying the pitch angle of each blade to compensate for the asymmetric load moment. The individual pitch control signal for each blade is determined at least based on the high order harmonics.

20 Claims, 7 Drawing Sheets

(52) U.S. Cl.
CPC ........... *F03D 7/0296* (2013.01); *F03D 7/043* (2013.01); *F05B 2260/966* (2013.01); *F05B 2270/331* (2013.01); *Y02E 10/723* (2013.01)

(56) References Cited

FOREIGN PATENT DOCUMENTS

| | | | | |
|---|---|---|---|---|
| EP | 2447527 A1 | 5/2012 | | |
| WO | WO 2010020450 A1 * | 2/2010 | ........... | F03D 7/0224 |

OTHER PUBLICATIONS

Bossanyi et al.: "Further load reductions with individual pitch control", x Wind Energy, Wiley, Chichester, GB, vol. 8, No. 4, Jan. 1, 2005, pp. 481-485.
International Search Report for PCT/DK2013/050180, dated Sep. 18, 2013.
Danish Search Report for PA 2012 70527, dated Apr. 16, 2013.

* cited by examiner

COMPENSATION FOR ASYMMETRIC LOAD MOMENT EXPERIENCED BY WIND TURBINE ROTOR

The present invention relates to a method of operating a wind turbine. Further, the present invention relates to a controller system for controlling operation of a wind turbine. Finally, the present invention relates to a wind turbine.

BACKGROUND

The use of wind turbines has become a common way of generating electricity and the size and performance of the turbines have increased. The wind turbines typically include multiple blades which transform wind energy into rotational motion of a drive train to thereby produce electricity. Existing turbines are controlled by computerised controllers which can amend various settings to bring the turbine to an optimum with regards to power production, load on the blades and drive train and general wear on the turbine.

Often, the blades can rotate about their longitudinal axis and thereby convert a varying degree of the wind energy. This activity is referred to as "pitching", and in a traditional wind turbine, pitching is controlled such that the wind turbine utilises as much of the available wind energy until a rated power production is reached. If the wind turbine has reached the rated power production and the available wind energy increases further, the blades are pitched away from the optimal situation to maintain the rated power production. At a certain cut-out wind energy intensity, the blades are pitched to a position where transformation between wind energy and rotational motion is prevented. This is often referred to as "feathering". The rotation stops and the control system waits for a decrease in wind intensity before reinitiating production by pitching back the blades from the feathered position.

The loads on the wind turbine structure are highly dependent on the climate conditions in which the turbine operates and the size of the major components e.g. blades. Different control algorithms are deployed today on the wind turbines to reduce the loads based on climate conditions.

Asymmetrical loadings across a turbine rotor are responsible for a significant contribution to fatigue loads. Asymmetrical loadings are caused e.g. by wind shear, resulting in tilt and yaw moments on the turbine rotor. Such asymmetrical loadings on the turbine rotor could be detected based on conditions, e.g. blade bending, experienced individually by each blade. Today wind turbine controllers are sometimes adapted to reduce or eliminate such tilt and yaw moments on the wind turbine rotor by controlling the pitch of each blade separately. Sometimes, this is referred to as Tilt and Yaw Control (TYC). In practise, the asymmetric loads are balanced by cyclic pitching of the blades based on estimated/calculated tilt and yaw moment on the rotor.

With the growing size of wind turbines, spatial wind distribution over the turbine rotor becomes more significant. As an example, there may exist a region of high wind speed at the upper region of the area defined by the rotor plane as shown in FIG. 1. This high wind speed region may be small enough to fit into the area between two blades.

In such a scenario, the rotor torque and thrust as well as tilt and yaw moments vary as a function of the position of the blade (i.e. rotor azimuth angle). While rotating, the upwards pointing blade enters the high wind speed area and leaves it, before the next blade does the same. This spatial wind speed distribution creates rotor loads which are pulsating or oscillating 3 times during one revolution. Such loads are also known as 3p loads and contribute to the overall asymmetrical loadings on the rotor. The 3p loads are also referred to as high order harmonics as they have frequency higher than the revolution of the rotor (1p).

It is desirable to provide a method and a system to eliminate or minimize such 3p loads on the rotor.

SUMMARY OF THE INVENTION

According to a first aspect of the invention, a method of operating a wind turbine is provided. The wind turbine comprises a turbine rotor with at least two blades, each blade having a variable pitch angle. The method comprises determining mechanical loads on the blades, determining an asymmetric load moment experienced by the turbine rotor based on the mechanical loads on the blades, determining high order harmonics from the asymmetric load moment, and determining an individual pitch control signal for each of the blades for varying the pitch angle of each blade to compensate for the asymmetric load moment. The individual pitch control signal for each blade is determined at least based on the high order harmonics.

The mechanical loads may be determined, for example, by measuring blade bending, blade root moments, torque in the drive train or on the rotor shaft, angle of attack of the wind on the blades, etc. It can also be determined by measuring the performance such as the power generation of an electric generator in the wind turbine or any similar well known manner. Sensors may be placed at suitable locations in the turbine for obtaining readings used for determining loads. For example, sensors may be placed on blade roots to detect blade bending, or accelerometers may be placed on nacelle of the turbine to detect tower vibrations.

Asymmetric load moments may generally refer to asymmetric forces/loads acting on the rotor in a vertical and/or horizontal plane. An asymmetric force distribution in the vertical plane results in a moment around a horizontal axis, also known as tilt moment. In FIG. 2, the horizontal axis is denoted by the horizontal line 150, and the tilt moment is denoted by the arrow 151.

To orient a nacelle of the turbine and a rotor plane defined by the blades directly up against the wind, the nacelle is typically made rotatable with respect to the turbine tower, that is, about a yaw axis defined as a vertical line, for example through the tower. An asymmetric force distribution on the rotor in the horizontal plane results in a turning force on the rotor about the yaw axis. Such turning force may be referred to as yaw moment. In FIG. 2, the yaw or vertical axis is denoted by the vertical line 160, and the yaw moment is denoted by the arrow 161.

High order harmonics generally refer to the asymmetrical load moments which have frequencies higher than the rotor rotational speed, typically one or more orders higher than the rotor rotational speed. These high order harmonics of the asymmetrical load moments are taken into account when determining the individual pitch control signal for each of the blades. These high order harmonics may develop due to non-linear wind distributions over the rotor plane. High order harmonics may also develop due to the non-linear characteristics of the aerodynamic lift coefficient as shown in FIG. 3. It can be seen that when the angle of attack of the wind on the blades is at about 12 degrees, the lift coefficient no longer has a linear relationship with the angle of attack.

In fixed frame loads like tilt and yaw moment, the high order harmonics appear as 3p, 6p, 9p, etc loads. With the disclosed method of the invention, these high order harmonics are removed or minimized by cyclic pitching of each of the blades. This results in the turbine rotor experiencing lower loads, and hence extending the lifetime of the wind turbine. Furthermore, implementing the invention does not require any hardware changes. Only a software configuration is needed.

According to an embodiment, determining the asymmetric load moment comprises determining at least one of tilt moment and yaw moment. In other words, the embodiment may determine the tilt moment or the yaw moment, or both the tilt and yaw moments and control the pitch angle of the blades accordingly.

According to an embodiment, determining the individual pitch control signal comprises subtracting the high order harmonics from a reference value to generate a modified reference value, determining high order harmonics components based on the modified reference value, generating a cyclic pitch value based on the high order harmonics components for each blade, summing the cyclic pitch value with a collective pitch value to generate the individual pitch control signal for each blade, and controlling the pitch angle of each blade based on the corresponding individual pitch control signal.

The high order harmonics is compared with a reference high order harmonics value to determine the amount of deviation, and the cyclic pitch value for each blade is determined accordingly. The reference high order harmonics value may be set to zero in order to eliminate the high order harmonics in one embodiment. It may be set to other values in other embodiments.

The collective pitch value is a common pitch value which controls the pitch angle of all the blades of the turbine. In other words, when only a collective pitch value is given, all the blades of the turbine are controlled to move to the same pitch angle (or same pitch offset) in accordance to the collective pitch value. The cyclic pitch value modifies the pitch offset of each individual blade. When a cyclic pitch value is added to the collective pitch value for a blade, the pitch angle of the blade is modified accordingly. The cyclic pitch values for each blade are different. Accordingly, each blade pitch angle is controlled differently to eliminate or minimize the high order harmonics in the rotor.

According to an embodiment, determining high order harmonics from the asymmetric load moment comprises frequency modulating the asymmetric load moment, and notch filtering the frequency modulated asymmetric load moment to generate the high order harmonics.

According to an embodiment, determining high order harmonics from the asymmetric load moment further comprises filtering the asymmetric load moment to remove low frequency components before modulating the asymmetric load moment.

According to a second aspect of the invention, a wind turbine is provided. The wind turbine comprises a turbine rotor with at least two blades, each blade having a variable pitch angle. The wind turbine comprises a load control system which is configured to determine mechanical loads on the blades, determine an asymmetric load moment experienced by the turbine rotor based on the mechanical loads on the blades, determine high order harmonics from the asymmetric load moment, and determine an individual pitch control signal for each of the blades for varying the pitch angle of each blade to compensate for the asymmetric load moment. The individual pitch control signal for each blade is determined at least based on the high order harmonics.

According to an embodiment, the load control system is configured to determine at least one of tilt moment and yaw moment as the asymmetric load moment.

According to an embodiment, the load control system comprises a first summing unit to subtract the high order harmonics from a reference value to generate a modified reference value, a Proportional Integral (PI) controller for determining high order harmonics components based on the modified reference value, a cyclic pitch actuator for generating a cyclic pitch value based on the high order harmonics components for each blade, a second summing unit for summing the cyclic pitch value with a collective pitch value to generate the individual pitch control signal for each blade, and a pitch controller for controlling the pitch angle of each blade based on the corresponding individual pitch control signal.

According to an embodiment, the load control system further comprises a frequency modulator for modulating the asymmetric load moment, and a notch filter for filtering the frequency modulated asymmetric load moment to generate the high order harmonics.

According to an embodiment, the load control system further comprises a high pass filter for filtering off low frequency components from the asymmetric load moment before modulating the asymmetric load moment.

According to a third aspect of the invention, a load control system for use in a wind turbine is provided. The wind turbine includes a turbine rotor with at least two blades, each blade having a variable pitch angle. The load control system is configured to determine mechanical loads on the blades, determine an asymmetric load moment experienced by the turbine rotor based on the mechanical loads on the blades, determine high order harmonics from the asymmetric load moment, and determine an individual pitch control signal for each of the blades for varying the pitch angle of each blade to compensate for the asymmetric load moment, wherein the individual pitch control signal for each blade is determined at least based on the high order harmonics.

BRIEF DESCRIPTION OF THE DRAWINGS

The invention will be better understood with reference to the detailed description when considered in conjunction with the non-limiting examples and the accompanying drawings.

DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
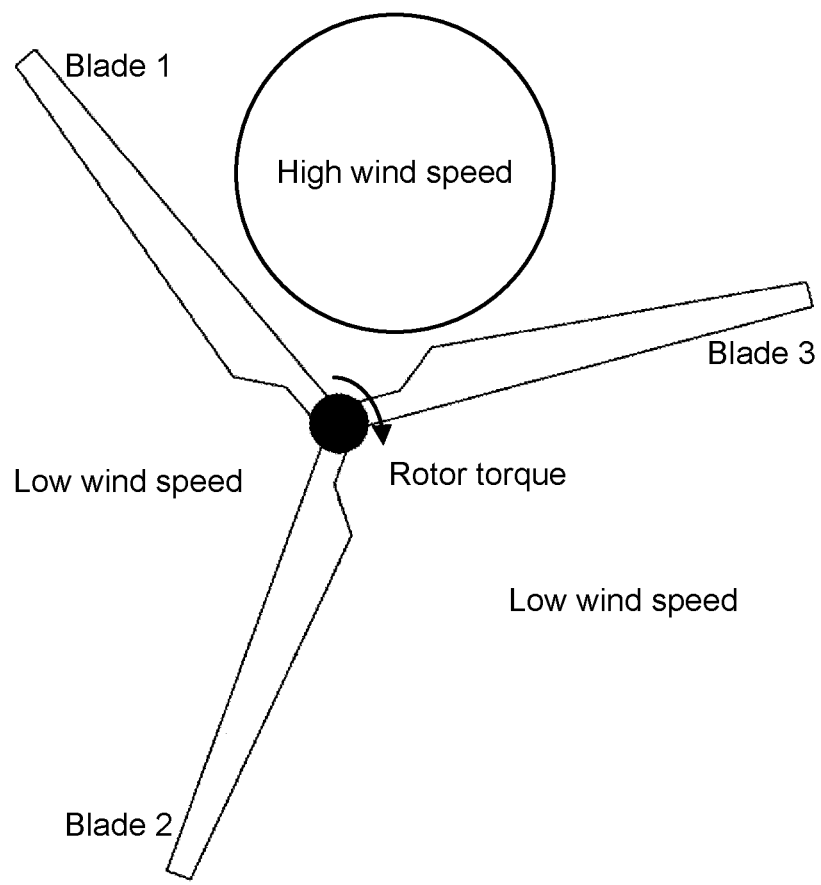
FIG. 1 shows a rotor of a wind turbine having a high speed region.
Figure 2:
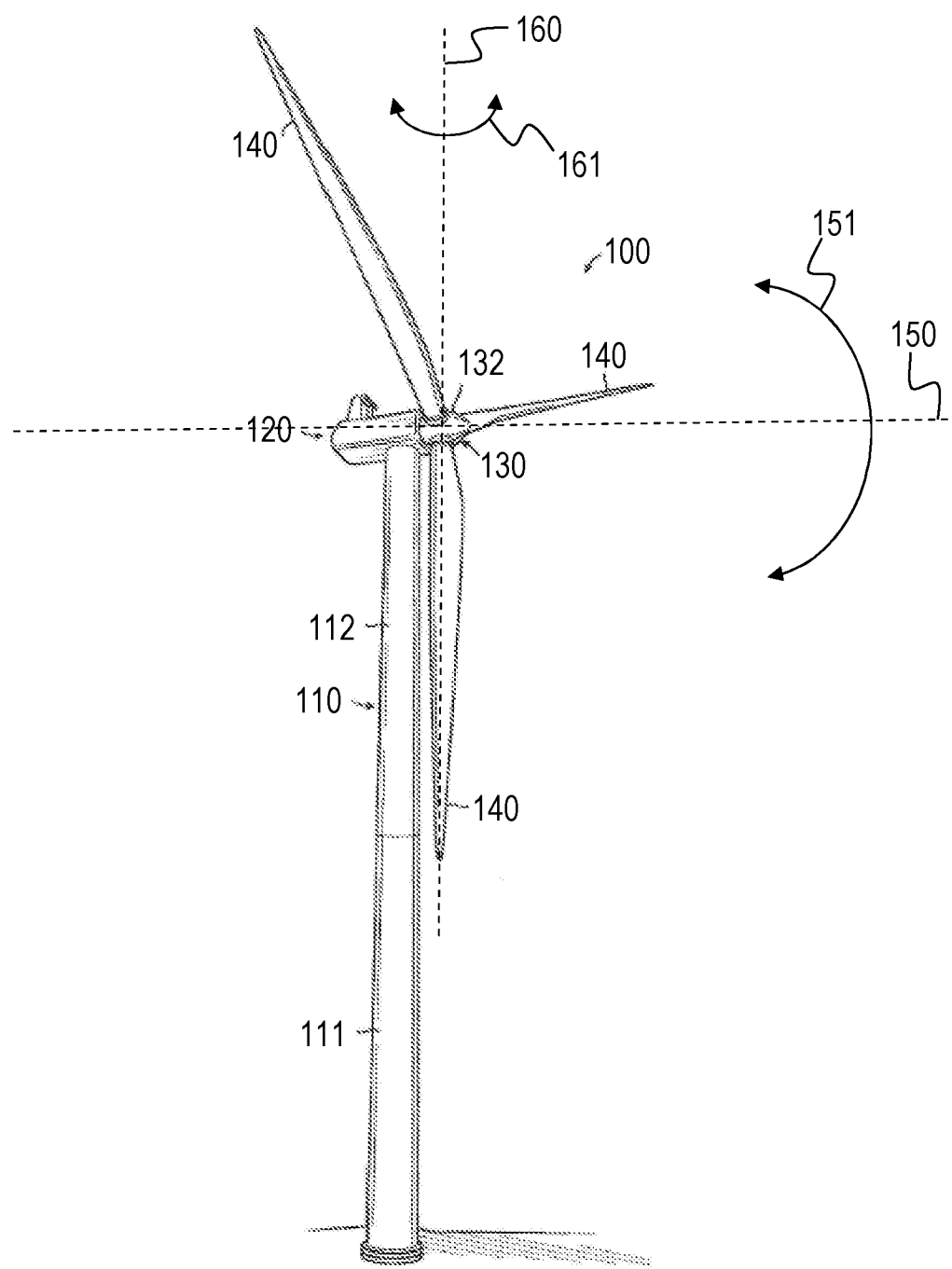
FIG. 2 shows a general structure of a wind turbine.
Figure 3:
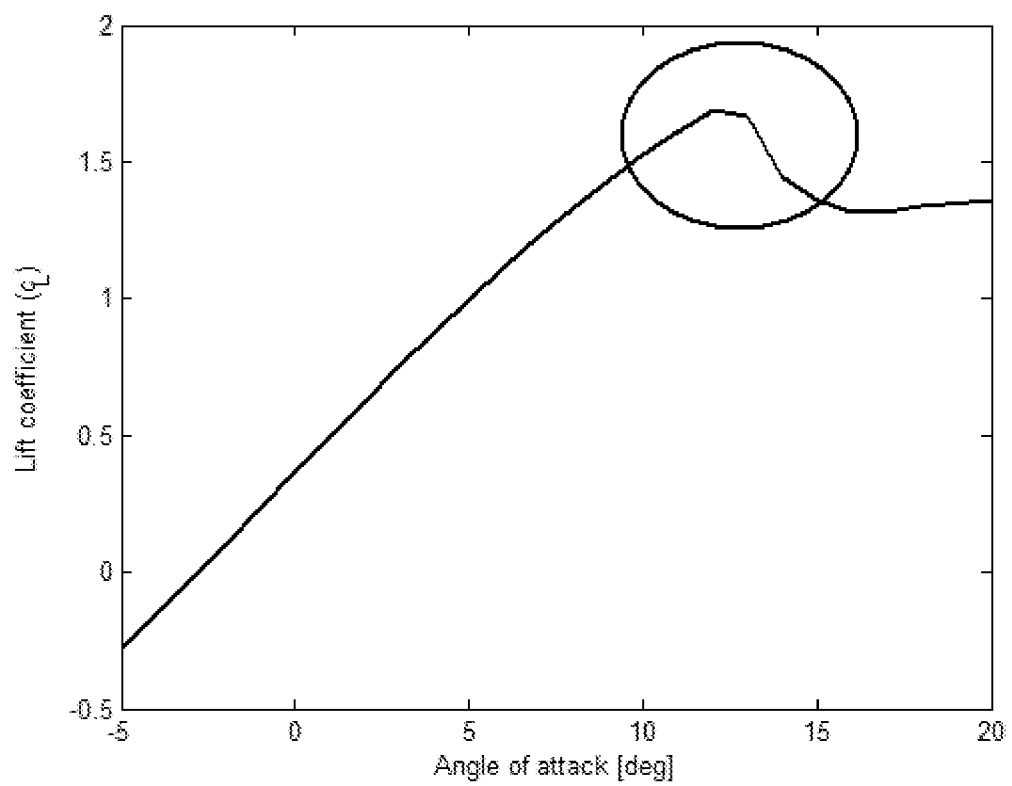
FIG. 3 shows the relationship between the lift coefficient and the angle of attack of the wind on the wind turbine blades.

FIG. 2 illustrates an exemplary wind turbine 100 according to an embodiment. As illustrated in FIG. 2, the wind turbine 100 includes a tower 110, a nacelle 120, and a rotor 130. In one embodiment, the wind turbine 100 may be an onshore wind turbine. However, embodiments of the invention are not limited only to onshore wind turbines. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of the wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 2. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 2). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 140 further comprises mechanisms (not shown) for adjusting the pitch of the blade 140 to increase or reduce the amount of wind energy captured by the blade 140. Pitching adjusts the angle at which the wind strikes the blade 140. It is also possible that the pitch of the blades 140 cannot be adjusted. In this case, the aerodynamic profile of the blades 140 is designed in a manner that the lift experienced by the blades are lost when the wind speed exceeded a certain threshold, causing the turbine to stall.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the wind turbine 100 shown in FIG. 2 has three blades 140, it should be noted that a wind turbine may have different number of blades. It is common to find wind turbines having two to four blades. The wind turbine 100 shown in FIG. 2 is a Horizontal Axis Wind Turbine (HAWT) as the rotor 130 rotates about a horizontal axis. It should be noted that the rotor 130 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 140 in the rotor 130.

Figure 4:
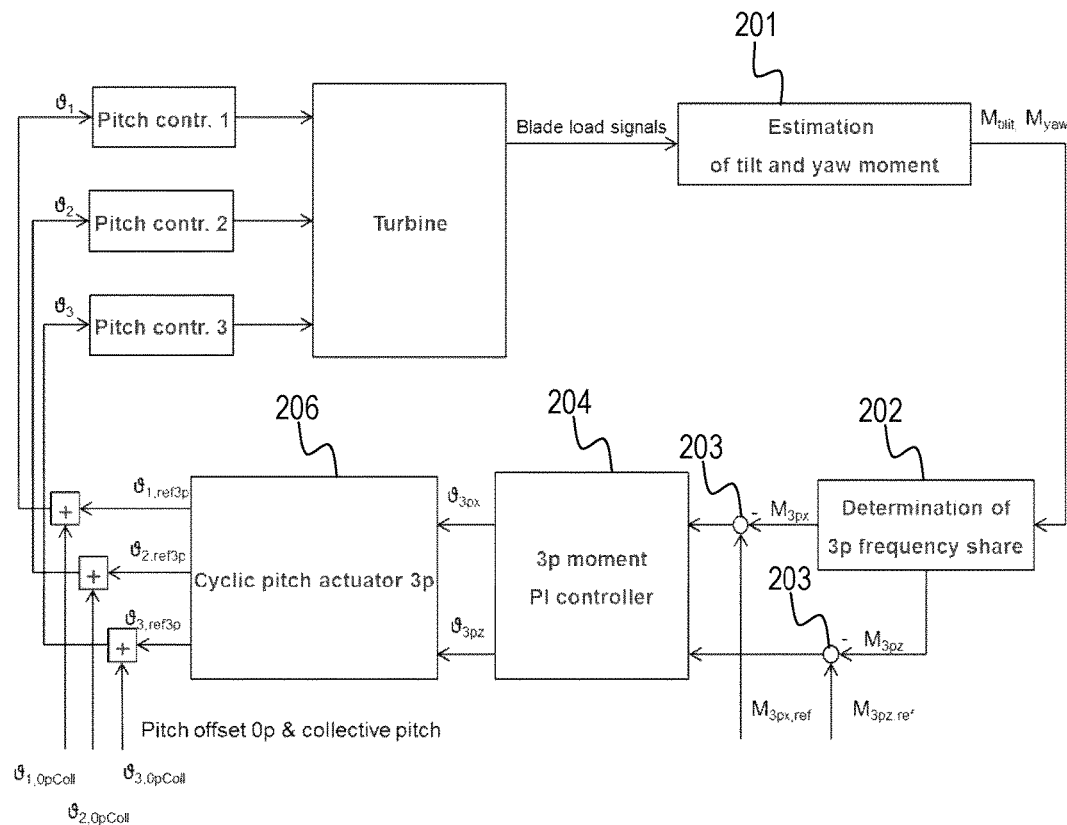
FIG. 4 shows a system layout of a control system for controlling the pitch angle of the turbine according to an embodiment.

FIG. 4 shows a system layout of a control system for controlling the pitch angle of the turbine according to an embodiment. The tilt and yaw moments ($M_{tilt}$ and $M_{yaw}$) are determined in a first determining unit 201 on the basis of the measured blade load signals, for example blade root bending moments. It should be noted that other signals for determining the tilt and yaw moments may be measured in addition or alternative to blade load signals.

From the tilt and yaw moments, the 3p frequency components ($M_{3x}$ and $M_{3pz}$) of the tilt and yaw moments are determined in a second determining unit 202. It should be noted that 1p corresponds to one full revolution or rotation of the rotor. The 3p frequency components are subtracted from their respective reference values in a summing unit 203 to obtain an error value or modified reference value. Specifically, the x moment 3p frequency components are subtracted from a reference x moment 3p frequency component value ($M_{3px\_ref}$) to generate a x moment 3p frequency component error value. The z moment 3p frequency components are subtracted from a reference z moment 3p frequency component value ($M_{3pz\_ref}$) to generate a z moment 3p frequency component error value.

The error values are fed into a PI controller 204 and subsequently transformed in a cyclic pitch actuator 206 into respective cyclic pitch values of 2p frequency ($\theta_{1,\ ref3p}$, $\theta_{2,\ ref3p}$ and $\theta_{3,\ ref3p}$). Pitch control signals for the respective turbine blades are generated when the cyclic pitch values are summed with the collective and 0p (pitch offset) moment control pitch values ($\theta_{10pColl}$, $\theta_{20pColl}$ and $\theta_{30pColl}$). The pitch control signals are used to individually control the turbine blades. Since the 2p cyclic pitch values are determined to compensate the 3p tilt and yaw moments, the resultant pitch control signals adjust the respective pitch angles of the blades such that the tilt and yaw moments as well as the 3p frequency components thereof are removed or minimized.

Figure 5:
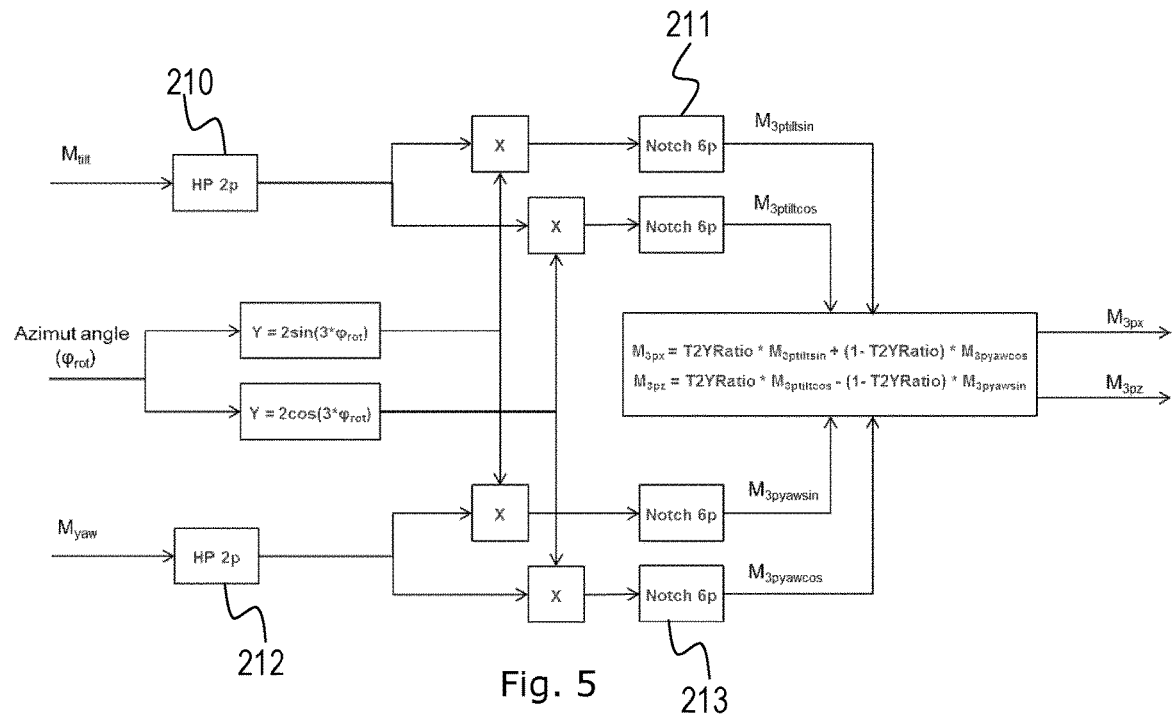
FIG. 5 shows a block diagram on how to obtain the high order harmonics according to an embodiment.

FIG. 5 shows a block diagram of the second determining unit 202 on how to determine the high order harmonics (i.e. 3p frequency components) of the tilt and yaw moments according to an embodiment. Specifically, the tilt moment $M_{tilt}$ is passed through a high-pass filter 210 to remove the unwanted frequency components equal or below 1p (i.e. frequency components equal or below the rotor speed). The filtered tilt moment $M_{tilt}$ is then modulated by sinusoidal carrier signals. The carrier signals may be represented as:

$Y=2\sin(3*\phi_{rot})$;

$Y=2\sin(3*\phi_{rot})$, where $\phi_{rot}$ is the azimuth angle of the rotor.

Hence the frequency of the carrier signals are dependent on the azimuth angle of the turbine rotor. The modulated signals are then passed through notch filters 211 to generate the 3p frequency components of the tilt moment $M_{3ptiltsin}$, $M_{3ptiltcos}$.

Similarly, the yaw moment $M_{yaw}$ is passed through a high-pass filter 212 to remove the unwanted signal components equal or below 1p. The filtered yaw moment $M_{yaw}$ is then modulated by the sinusoidal carrier signals. The modulated signals are then passed through notch filters 213 to generate the 3p frequency components of the yaw moment $M_{3pyawsin}$, $M_{3pyawcos}$. The tilt and yaw 3p frequency components $M_{3ptiltsin}$, $M_{3ptiltcos}$, $M_{3pyawsin}$, $M_{3pyawcos}$ are then transformed to x and z moment frequency components ($M_{3px}$, $M_{3pz}$) by summing the individual 3p components and weighting them with a factor (T2YRatio) between one and zero. Specifically, $M_{3px}$ is calculated by summing the product of tilt moment sine share ($M_{3ptiltsin}$) and weighting factor T2YRatio and the product of yaw moment cosine share ($M_{3pyawcos}$) and one minus weighting factor T2YRatio. Accordingly, $M_{3pz}$ is calculated by summing the product of tilt moment cosine share ($M_{3ptiltcos}$) and weighting factor T2YRatio and the product of negative yaw moment sine share ($-M_{3pyawsin}$) and one minus weighting factor T2YRatio.

Figure 6:
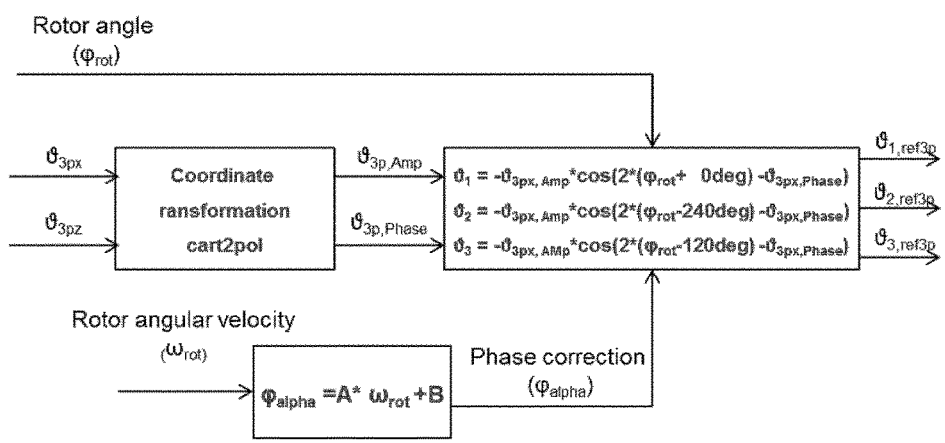
FIG. 6 shows a block diagram on the cyclic pitch actuator according an embodiment.

FIG. 6 shows a block diagram of the cyclic pitch actuator 206 according to an embodiment. The cyclic pitch actuator is a function of the rotor azimuth angle $\phi_{rot}$ as well as the phase correction $\phi_{alpha}$. The phase correction is dependent on the rotor angular velocity or rotor speed ($\omega_{rot}$). This block transforms the specified pitch amplitude of 3p components of $\theta_{3px}$ and $\theta_{3pz}$ into the angle of three pitch blade components $\theta_{1,ref3p}$, $\theta_{2,ref3p}$ and $\theta_{3,ref3p}$.

Figure 7:
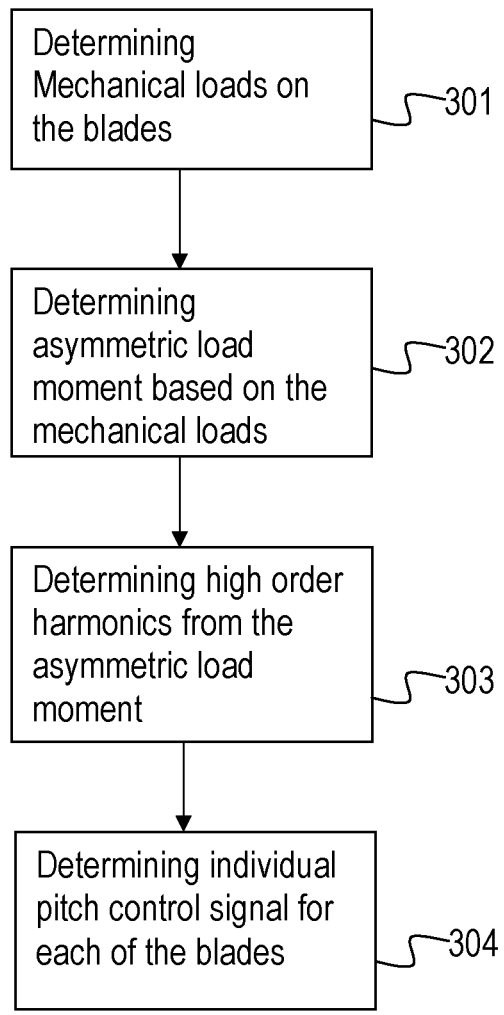
FIG. 7 shows a flow-chart of the method of controlling the wind turbine according to an embodiment.

FIG. 7 shows a flow-chart of the method for controlling the wind turbine according to an embodiment. Step 301 includes determining the mechanical loads on the blades. Step 302 includes determining the asymmetric load moment based on the determined mechanical loads on the blades. The asymmetric load moment may include tilt moment or yaw moment or both the tilt and yaw moments. Step 303 includes determining the high order harmonics from the asymmetric load moment. These high order harmonics, for example, includes 3p frequency components. Step 304 includes determining the individual pitch control signals for controlling the pitch angle of each of the blades. The individual pitch control signals are determined at least based on the high order harmonics, such that the 3p load components are compensated.

Figure 8:
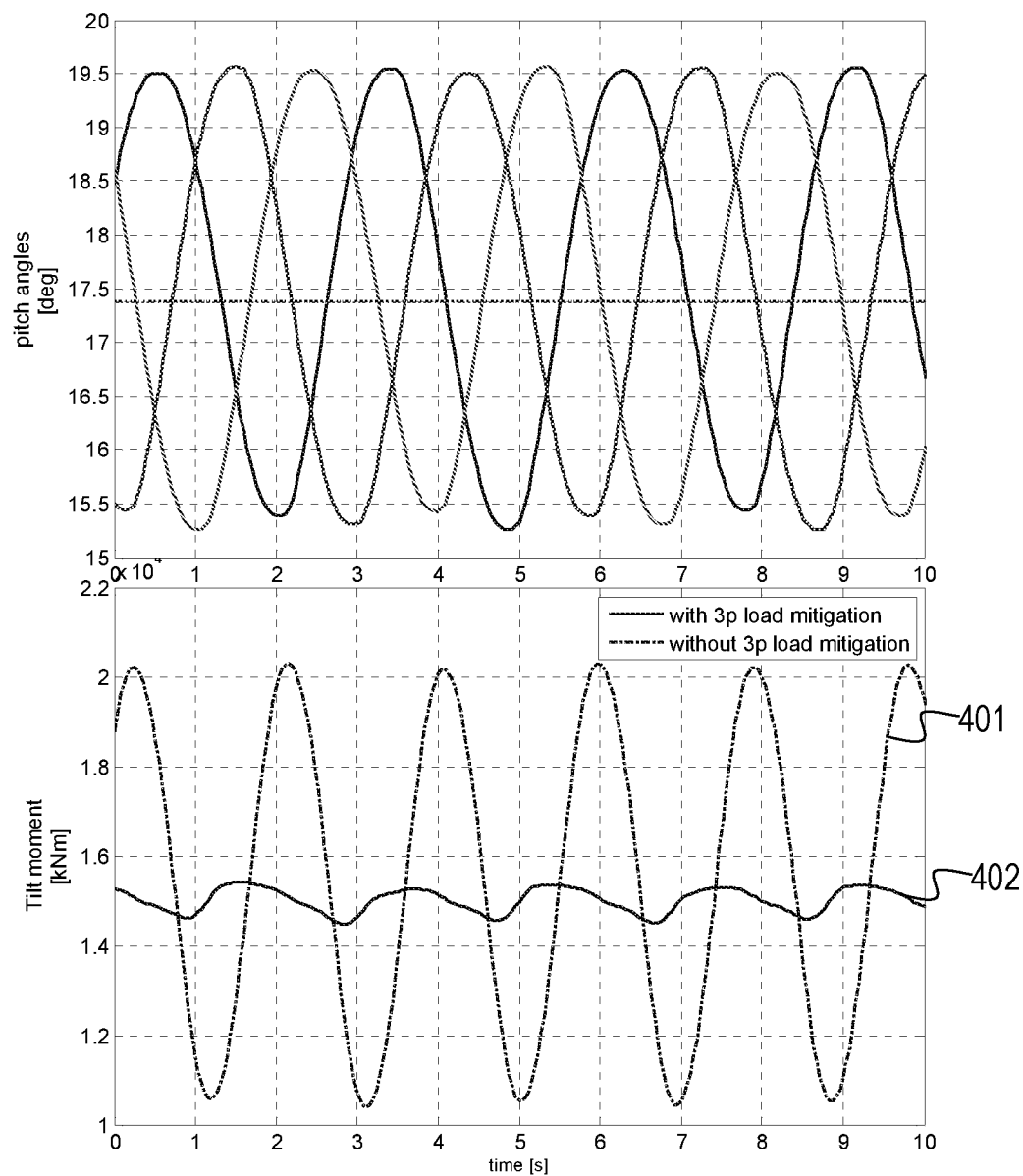
FIG. 8 shows a graph illustrating the effect of high order harmonics with and without using the method according to the embodiment.

FIG. 8 shows a graph illustrating the effect of high order harmonics with and without using the method according to the embodiment. Two simulations of a turbine, operating at a wind speed of 35 m/s and a yaw error of 45 degrees are compared. In this situation, the 3p loads are particularly strong. Without tilt and yaw moment mitigation, the turbine runs at a constant pitch angle of 17.4 degrees. The tilt moment oscillates between 10.5 and 20.5 MNm with a frequency of 0.5 Hz, which matches the 3p frequency of this turbine (see curve 401).

With activated tilt and yaw moment mitigation according to the embodiment, the pitch is operated in a cyclic scheme with a frequency of 0.33 Hz (2p). In this case, the tilt moment only has oscillations of about 1 MNm, i.e 1/10 of the original value (see curve 402), while the mean value remains the same.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of operating a wind turbine comprising a turbine rotor with at least two blades, each blade of the at least two blades having a variable pitch angle, the method comprising:
    determining, using one or more sensors of the wind turbine that are communicatively coupled with one or more computer processors of the wind turbine, mechanical loads on the at least two blades:
    frequency modulating a signal that is based on the asymmetric load moment to produce a frequency-modulated signal: and
    notch filtering the frequency-modulated signal to identify the high order harmonics; and
    determining, using the high order harmonics, an individual pitch control signal for each blade of the at least two blades for varying a pitch angle of each blade to compensate for the asymmetric load moment; and
    controlling, using a pitch controller, the pitch angle of each blade based on the corresponding individual pitch control signal.

2. The method of claim 1, wherein determining the asymmetric load moment comprises determining at least one of tilt moment and yaw moment.

3. The method of claim 1, wherein determining the individual pitch control signal comprises:
    subtracting the high order harmonics from a reference value to generate a modified reference value;
    determining high order harmonics components based on the modified reference value;
    generating a cyclic pitch value based on the high order harmonics components for each blade; and
    summing the cyclic pitch value with a collective pitch value to generate the individual pitch control signal for each blade.

4. The method of claim 1, further comprising:
    filtering the asymmetric load moment to remove low frequency components to produce the signal before frequency modulating the signal.

5. The method of claim 1, wherein determining an asymmetric load moment comprises determining the tilt moment and the yaw moment,
    wherein frequency modulating the asymmetric load moment comprises:
        determining a first plurality of frequency-modulated signals using the tilt moment; and
        determining a second plurality of frequency-modulated signals using the yaw moment, and
    wherein notch filtering the frequency-modulated asymmetric load moment comprises:
        notch filtering each of the first plurality of frequency-modulated signals to identify a plurality of tilt moment frequency components; and notch filtering each of the second plurality of frequency-modulated signals to identify a plurality of yaw moment frequency components.

6. The method of claim 5, further comprising:
transforming the plurality of tilt moment frequency components and the plurality of yaw moment frequency components to produce an x-moment frequency component and a z-moment frequency component,
wherein the individual pitch control signal for each blade of the at least two blades is determined using the x-moment frequency component and the z-moment frequency component.

7. The method of claim 6, wherein the plurality of tilt moment frequency components and the plurality of yaw moment frequency components are transformed using a predefined weighting factor that is selected from a predefined range from zero to one.

8. The method of claim 7, wherein the x-moment frequency component is produced by summing (1) a product of the predefined weighting factor and a first tilt moment frequency component and (2) a product of a first yaw moment frequency component and (one minus the predefined weighting factor), and
wherein the z-moment frequency component is produced by summing (3) a product of the predefined weighting factor and a second tilt moment frequency component and (4) a product of a negative second yaw moment frequency component and (one minus the predefined weighting factor).

9. The method of claim 5, wherein determining the first plurality of frequency-modulated signals comprises applying each of a first carrier signal and a second carrier signal to a first signal that is based on the tilt moment, and
wherein determining the second plurality of frequency-modulated signals comprises applying each of the first carrier signal and the second carrier signal to a second signal that is based on the yaw moment.

10. The method of claim 9, wherein the first signal is produced by passing the tilt moment through a first high-pass filter, and wherein the second signal is produced by passing the yaw moment through a second high-pass filter.

11. The method of claim 10, wherein a cutoff frequency of the first high-pass filter and the second high-pass filter corresponds to a rotor speed of the turbine rotor.

12. The method of claim 9, wherein the first carrier signal and the second carrier signal are each based on an azimuth angle of the turbine rotor.

13. A wind turbine comprising: a turbine rotor with at least two blades, each blade of the at least two blades having a variable pitch angle; and a load control system comprising one or more computer processors, wherein the load control system is configured to:
determine, using one or more sensors, mechanical loads on the at least two blades;
determine, using the mechanical loads, an asymmetric load moment experienced by the turbine rotor;
determine high order harmonics from the asymmetric load moment by:
frequency modulating a signal that is based on the asymmetric load moment to produce a frequency-modulated signal; and
notch filtering the frequency-modulated signal to identify the high order harmonics;
determine, using the high order harmonics, an individual pitch control signal for each blade of the at least two blades for varying a pitch angle of each blade to compensate for the asymmetric load moment; and control, using a pitch controller, the pitch angle of each blade based on the corresponding individual pitch control signal.

14. The wind turbine of claim 13, wherein the load control system is configured to determine at least one of tilt moment and yaw moment as the asymmetric load moment.

15. The wind turbine of claim 13, wherein the load control system comprises: a first summing unit to subtract the high order harmonics from a reference value to generate a modified reference value;
a Proportional Integral (PI) controller for determining high order harmonics components based on the modified reference value;
a cyclic pitch actuator for generating a cyclic pitch value based on the high order harmonics components for each blade; and
a second summing unit for summing the cyclic pitch value with a collective pitch value to generate the individual pitch control signal for each blade.

16. The wind turbine of claim 13, wherein the load control system further comprises:
a frequency modulator for frequency modulating the signal; and
a notch filter for filtering the frequency-modulated signal to produce the high order harmonics.

17. The wind turbine of claim 13, wherein the load control system further comprises a high pass filter for filtering off low frequency components from the asymmetric load moment to produce the signal before frequency modulating the signal.

18. A load control system for use in a wind turbine having a turbine rotor with at least two blades, each blade of the at least two blades having a variable pitch angle, the load control system comprising one or more computer processors, wherein the load control system is configured to:
determine, using one or more sensors physically coupled with the wind turbine, mechanical loads on the at least two blades;
determine, using the mechanical loads, an asymmetric load moment experienced by the turbine rotor, wherein the asymmetric load moment comprises one or both of a tilt moment and a yaw moment;
determine high order harmonics from the asymmetric load moment by:
frequency modulating a signal that is based on the asymmetric load moment to produce a frequency-modulated signal; and
notch filtering the frequency-modulated signal to identify the high order harmonics;
determine, using the high order harmonics, an individual pitch control signal for each blade of the at least two blades for varying a pitch angle of each blade to compensate for the asymmetric load moment; and control, using a pitch controller, the pitch angle of each blade based on the corresponding individual pitch control signal.

19. The load control system of claim 18, further comprising:
a first summing unit configured to subtract the high order harmonics from a reference value to generate a modified reference value;
a Proportional Integral (PI) controller configured to determine high order harmonics components based on the modified reference value;

a cyclic pitch actuator configured to generate a cyclic pitch value based on the high order harmonics components for each blade; and a second summing unit configured to sum the cyclic pitch value with a collective pitch value to generate the individual pitch control signal for each blade.

20. The load control system of claim 19, further comprising:

a frequency modulator for frequency modulating the signal;

a notch filter for filtering the frequency-modulated signal to produce the high order harmonics; and a high pass filter for filtering off low frequency components from the asymmetric load moment to produce the signal before frequency modulating the signal.

* * * * *